No. 771,609. Patented October 4, 1904.

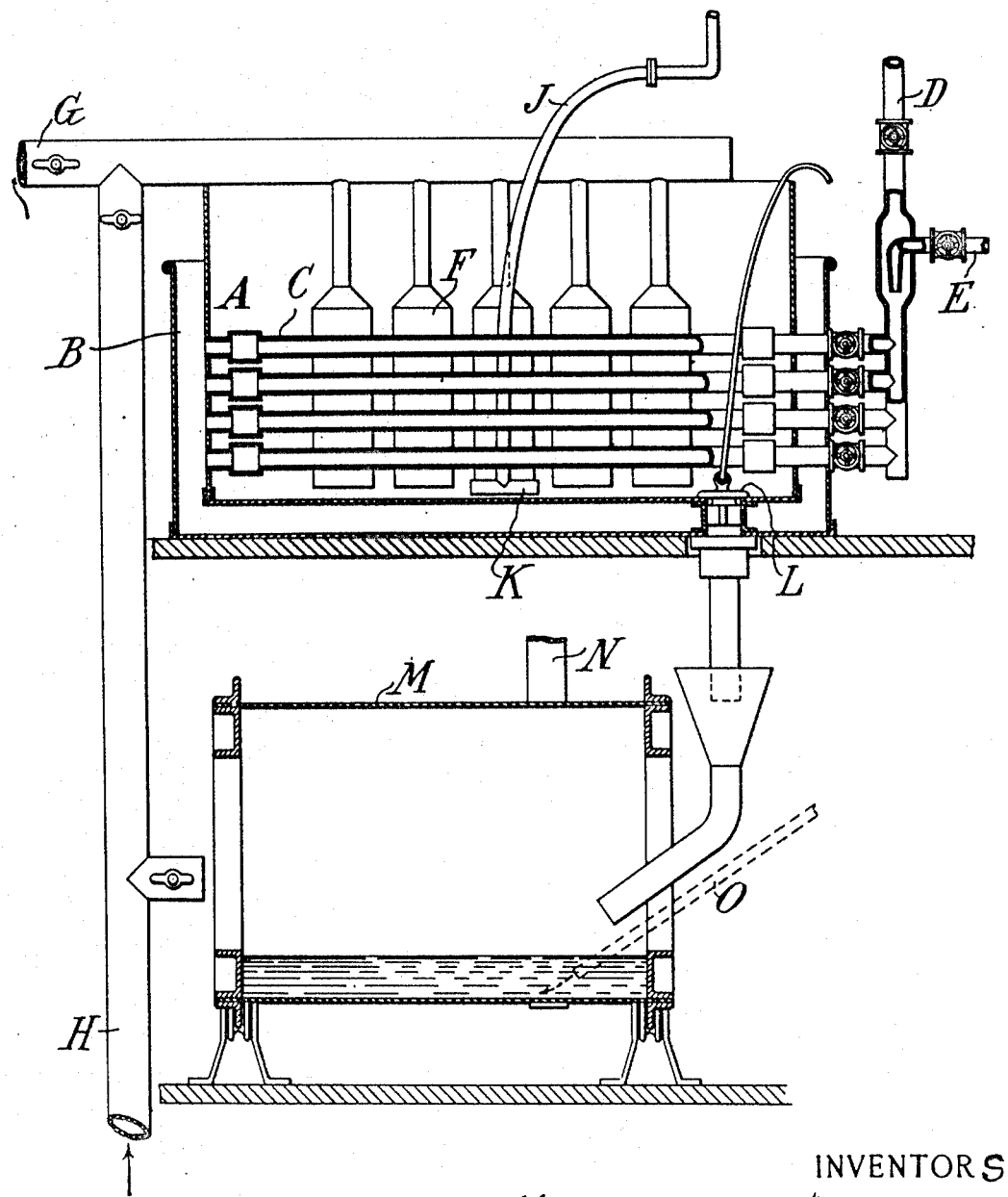

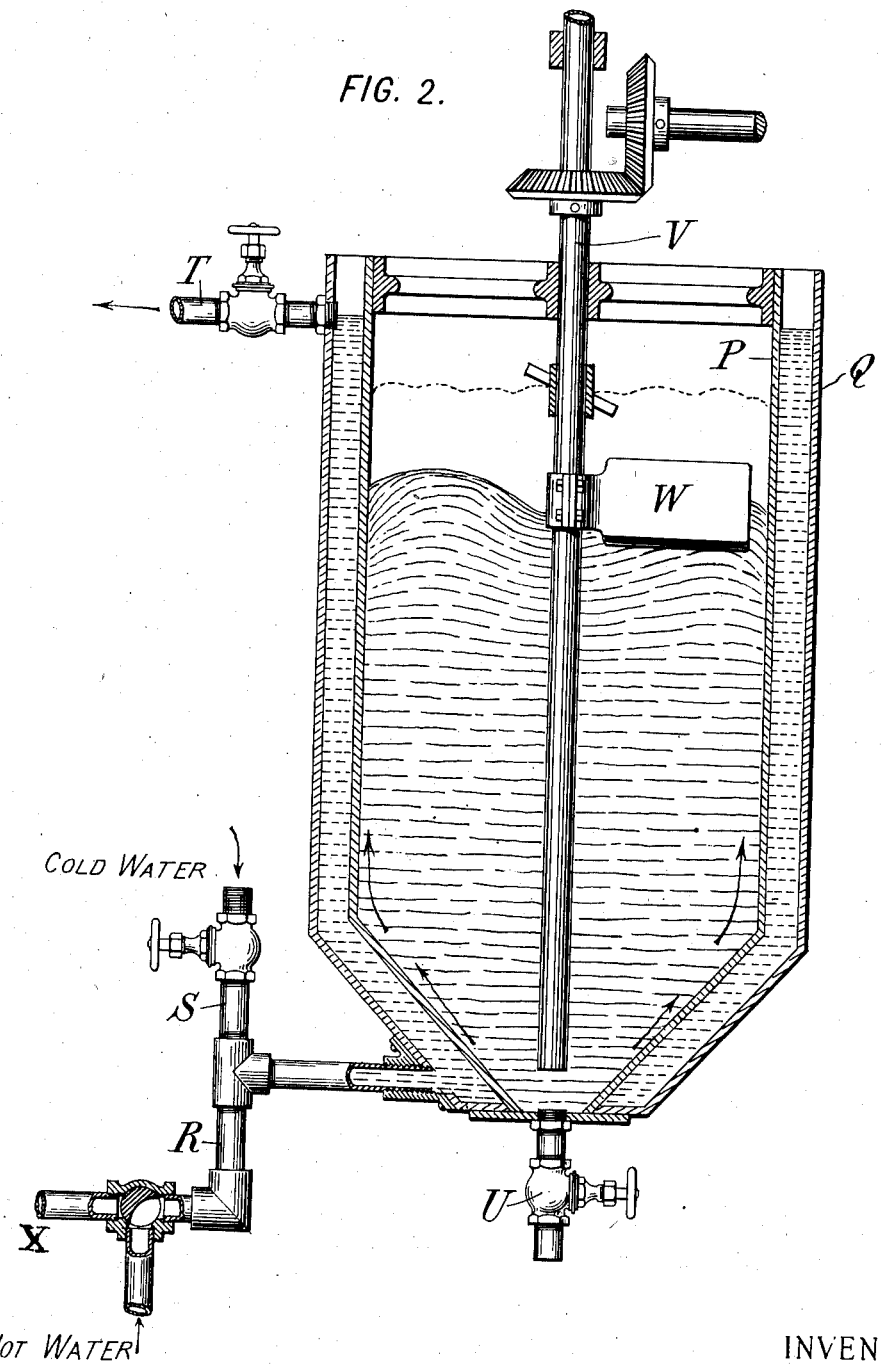

UNITED STATES PATENT OFFICE.

CHARLES H. CAMPBELL, OF NEW YORK, N. Y., AND PEARL T. CAMPBELL, OF BAYONNE, NEW JERSEY.

PROCESS OF CONCENTRATING AND REMAKING MILK.

SPECIFICATION forming part of Letters Patent No. 771,609, dated October 4, 1904.

Application filed January 9, 1904. Serial No. 188,299. (No specimens.)

*To all whom it may concern:*

Be it known that we, CHARLES H. CAMPBELL, residing in the borough of Manhattan, city, county, and State of New York, and PEARL T. CAMPBELL, residing in Bayonne, in the county of Hudson and State of New Jersey, both citizens of the United States, have jointly invented certain new and useful Improvements in Concentrating and Remaking Milk, of which the following is a specification.

This invention relates to the concentrating of milk to a sufficient degree of dryness to facilitate the packaging and transporting thereof and to prevent its rapid spoiling and the subsequent bringing of the dry mass again into substantially permanent combination with water to remake liquid milk. Preferably the milk is first reduced to a completely-desiccated and finely-ground or floury condition. There is already such a completely-desiccated milk on the market, and we may use this product for the remaking of liquid milk, according to one feature of our invention. This product, however, is better adapted for other uses than the remaking of liquid milk. Preferably, therefore, the milk which is to be remade is concentrated according to a process which we have discovered and which we have found specially adapted to the production of a remade liquid milk which is so exactly like original milk in taste, and especially in odor, as to be hardly distinguished therefrom. It is understood that in order to be salable in the form of liquid milk the remade milk must be free from impurities, and especially from any taste or odor resembling that due to the souring of the milk. It is the freedom from perceptible odor which we have found most difficult to obtain, but which may be very largely obtained by certain features of the process of remaking the milk which we have invented or by the process of concentrating and which is obtainable in the highest degree by applying the remaking process to milk which has been concentrated according to the special process hereinafter described.

By this process a central plant may be established in a good milk country, in which the milk may be concentrated to substantial dryness, according to the first stage of the process. In this condition it may then be cheaply and conveniently stored or packed and shipped to countries where good milk is difficult to obtain, or it may be carried by armies or ocean vessels. Then when it is desired to use the product it may be submitted to the second stage of the process and restored to the form of the original liquid milk. When the first stage of the process is carried to such a length as to reduce the milk to complete desiccation, it will keep indefinitely. Where, however, it is only desired to keep the product in the intermediate stage for a few days, it need not be completely desiccated. Thus there can be obtained in places and under circumstances in which it was previously impossible a milk having the exact appearance, taste, and smell, as well as the exact composition, of untreated milk.

An important point in the first or concentrating step of the process is the subjection of the mass to a high temperature for so short a time as not to substantially modify the proteids. The coagulation of the proteids, which renders them insoluble and which therefore is to be avoided in obtaining the best product, takes place at about 162° Fahrenheit, and preferably the concentration is proceeded with at a temperature below this point. We have found, however, that by subjecting the material near the end of the concentrating process (say while it is in a substantially pasty mass) to a much higher temperature, as 180° Fahrenheit or higher, for a short time and quickly lowering the temperature again there is no substantial modification of the proteids, and a certain objectionable taste and odor which existed in remade milk which has been concentrated by other processes disappears. The objectionable qualities stated have been probably due to the presence of a small quantity of albumen, which even in the substantially desiccated intermediate stage of the product unites with the small percentage of water present and is so modified as to affect the remade milk. The difference in the product noticed may also be due to the sterilization accomplished by the high temperature. The momentary increase of heat may be used in connection with any suitable process. It is preferably, however, used in connection with the air-injection process described in the patent of Joseph H. Campbell, No. 668,161, whereby the process can be carried out at a low temperature and yet with such rapidity as to eliminate the water before fermentation takes place. Thus the intermediate product has its proteids in a soluble and peptogenic condition and is so soluble that it may be readily reunited with water to constitute the remade milk, and the remade milk may be drunk or otherwise used in the same manner as ordinary milk without perceptible difference in flavor, odor, or effect. In remaking the liquid milk water is added to the dry milk and the two are thoroughly combined, preferably by agitating and applying heat until the solids are brought into substantially permanent combination with the water. According to the amount of water added in the beginning and the length of time during which the process is carried on the fluidity of the product will vary. For example, it may be approximately that of ordinary fresh milk, or it may be reduced to the consistency of ordinary condensed milk. The agitation and heat soften and swell the particles of dry milk and break them up, so that they dissolve comparatively quickly. At the same time, either by the agitation referred to or by the blowing of air through the mass or by any other suitable method of aeration, the mass is purified of offensive odors, gases, and vapors, these being carried away in the process of aeration. The heat and aeration evaporate a certain amount of water, so that in the beginning a slight excess should be introduced over that which is desired in the final product. The process does not take very long, however, and the evaporation is not great. Large batches require hardly more time than small batches, the process being varied only in the quantity of heat and air applied. Preferably after the liquid milk is satisfactorily remade it is immediately cooled to check decomposition.

The accompanying drawings illustrate in vertical section (being largely diagrammatical) an apparatus with which the process may be carried out.

Figure 1 shows the apparatus for concentrating, and Fig. 2 the apparatus for remaking.

The concentrating apparatus comprises a milk-tank A, provided with a jacket B and coils C. The coils preferably empty into the jacket. A water-pipe D and steam-pipe E serve for the supplying of hot water or steam. Flat nozzles F extend to the bottom of the tank and serve to admit the necessary blast of air, being connected to a cold-air pipe G and a hot-air pipe H in order to obtain air of any desired temperature. J is a steam-pipe extending also, preferably, to the bottom of the tank, where it is provided with branches K, extending in opposite directions, for introducing a jet or blast of steam for suddenly raising the temperature. The milk partially concentrated in the tank A may pass out by means of a valve L and be conducted into the slowly-rotating drum or cylinder M, rotated by a belt N. The hot-air pipe H is provided with a branch, to which nozzles may be applied for blowing air into the rotating drum M. Likewise a steam-pipe O may be introduced into the mass of milk lying in the bottom of the drum.

The apparatus shown for use in remaking comprises a tank P, surrounded by a jacket Q, which jacket has two inlets R and S near its bottom and an outlet T near its top. The tank tapers at its lower end and terminates in an outlet-pipe U. The air may be introduced under pressure through a pipe V, leading to the bottom of the tank. The air-pipe V may be rotated by any suitable means, such as the bevel-gears shown, and may be provided with paddles W for a purpose hereinafter set forth. It is understood that this apparatus is not claimed in this application and is not essential to the process.

The process may be carried out in a great variety of apparatus. With the specific apparatus shown, however, the process may be carried out as follows: The milk to be treated is placed in the tank A, having been previously filtered or otherwise purified, if necessary. The milk may be either skim-milk or whole milk. Preferably it is partially skimmed, so as to leave a product of considerable richness, but not with so much fat in it as to prevent it from retaining a granular condition or to make it greasy to the touch. A temperature preferably approximating 100° to 120° Fahrenheit is then maintained by the circulation of hot water in the jacket and coils. The air-blast is turned on, and the air is thus forced into the milk and sweeps along the bottom of the tank in large volume and under considerable pressure, so that as it rises through the mass of milk it sets up a rolling motion, agitating the milk, taking up the vapor formed by the heat in the coils and jacket, and breaking up the fine bubbles which would tend to form with a smaller quantity of air and make a thick tough foam. The temperature of the heating-surface may be much higher than that at which the milk is maintained by the constant and strong blast of air, so that the process is very rapid. According to the process described in said previous Campbell patent the milk is reduced to about fifty per cent. of its original volume in this tank and then becomes so thick that the process becomes less efficient, and the product is then transferred to the cylinder or drum M, in which the complete desiccation may be effected. According to the present process shortly before the milk becomes so thick as to diminish the efficiency of the process in the first tank the air-supply is cut off, (except, perhaps, enough to agitate the mass,) the heating-water is cut off from the coils and jacket, and jets or blasts of steam are introduced through the nozzles K and are continued until the temperature of the mass rises gradually to about 170° or 180° Fahrenheit. As soon as the highest temperature desired is reached the steam is turned off and the air-blast is renewed, so that the mass is suddenly cooled again, preferably to 100° or 120°, after which it is introduced into the drum M, or the nearly-pasty mass in the tank A may be introduced into the drum M and there subjected to a blast of steam through the pipe O until raised to the desired temperature, after which by the rotation of the drum and the introduction of air at a suitable temperature it is quickly reduced to the desired temperature. The desiccation may then proceed in the manner described in detail in the Campbell patent, No. 668,162. The milk is drawn out into a film or coating of gradually-increasing thickness as the cylinder rotates, and the hot air blown on it carries away the water very rapidly until the product is reduced to a condition of comparatively dry lumps, which may be broken up and again subjected to a blast of hot air until they are substantially bone-dry, (containing about eight per cent. of water,) in which condition the mass may be ground to any desired degree of fineness.

When it is desired to remake the liquid milk, the desired quantity of milk-powder is first worked smooth in a little water, and then the total volume of water is added and the whole placed in the tank P, or all the water and the milk-powder may be put in at once and whipped or stirred together. The mass is gradually heated to any desired temperature, preferably below the boiling-point, by the introduction of hot water or other heating medium through the pipe R. Air is introduced in large volume and under heavy pressure. The air is forced violently through the mass, thoroughly aerating it and at the same time agitating it, so as to soften the particles and allow them to swell and be broken and finally dissolve or suspend permanently in the water. The thorough aeration has also the effect to very quickly carry off any offensive odors which may be present due to foreign matters in the original milk or to other causes. As a specific example, we may state that we have mixed the ingredients in the proportion of one and one-half pounds of milk-powder with two gallons of cold water and have brought this to a condition resembling pure sweet milk. We have found that from half an hour to one hour is required for such an operation.

As soon as the dry milk is thoroughly combined with the water it has the same tendency to decompose as ordinary fresh milk, and therefore it is proposed to stop such decomposition by immediately cooling it. For example, in the apparatus shown it is proposed to shut off the hot-water pipe R as soon as the combination is complete and turn on the cold-water pipe S, which will rapidly fill the jacket Q and cool the mass. The introduction of air through the pipe V may be continued, which expedites the cooling. Any other means for heating or cooling the mass or for aerating it may be adopted. For example, it may be aerated by agitation by paddles, preferably violent. The combination of heat and aeration whitens the product as well as purifying it of objectionable odors. In the remaking there is found also a great mechanical difficulty in the accumulation of foam, which rises to great heights and becomes very fine and tough, so as to seriously retard the aerating process. This may be overcome or at least diminished in several ways. A convenient process consists in beating the foam by means of any suitable number of paddles, such as W, clamped on the pipe V, the latter being rotated in order to cause these paddles to press down the foam. Two paddles are shown at right angles to each other; but any number may be employed and in any relative position, depending upon the size of the paddles and the height of the foam above the surface of the milk. The paddles may be of wire-netting instead of the solid material shown.

The hot water in the jacket Q may be removed very quickly by using a branch pipe X, connected by a three-way valve to the hot-water pipe R.

Though we have described with great particularity of detail a process embodying our invention, yet it is to be understood that the invention is not limited to the particular embodiment disclosed. Various modifications thereof in detail and in the order of the steps and the proportions of the ingredients may be made by those skilled in the art without departure from the invention.

What we claim is—

1. The process which consists in concentrating milk, subjecting it after partial concentration to a high temperature for so short a time as not to substantially modify the proteids, continuing the concentration to substantial dryness, and subsequently adding water and aerating the mass whereby a remade milk of substantially the purity of the original milk is produced.

2. The process which consists in concentrating milk at a temperature below about 162° Fahrenheit, subjecting it near the end of the process and for so short a time as not to substantially modify the proteids to a temperature about 180° Fahrenheit or higher, continuing the concentration to substantial dryness, and subsequently adding water and aerating the mass, whereby a remade milk of substantially the purity of the original milk is produced.

3. The process which consists in concentrating milk by heating it and simultaneously blowing air into it in such volume as to preserve the proteids in soluble and peptogenic condition and to concentrate the mass so rapidly as to prevent souring, subjecting it near the end of the concentration and for so short a time as to not substantially modify the proteids to a considerably-increased temperature, continuing the concentration to substantial dryness, subsequently adding water and heating and aerating the mass whereby a remade milk of substantially the purity of the original milk is produced.

4. The process which consists in concentrating milk by heating it and simultaneously blowing air into it in such volume as to preserve the proteids in soluble and peptogenic condition and to concentrate the mass so rapidly as to prevent souring, subjecting it near the end of the concentration and for so short a time as not to substantially modify the proteids to a considerably-increased temperature, continuing the concentration to substantial dryness, subsequently adding water and heating the mass and blowing air therethrough until the milk solids are brought into substantially permanent combination with the water, and then immediately cooling the mass to check decomposition.

5. The process which consists in concentrating milk by heating it and simultaneously blowing air into it in such volume as to preserve the proteids in soluble and peptogenic condition and to concentrate the mass so rapidly as to prevent souring, subjecting it near the end of the concentration and for so short a time as not to substantially modify the proteids to a considerably-increased temperature, continuing the concentration to substantial dryness, subsequently adding water and heating the mass below the boiling-point and blowing air violently therethrough to agitate and aerate it until the milk solids are brought into substantially permanent combination with the water, and then immediately cooling the mass to check decomposition.

6. The process of remaking liquid milk from dry milk which consists in adding water to the latter and aerating the mass to purify the product of offensive odors.

7. The process of remaking liquid milk from dry milk which consists in adding water to the latter and heating and aerating the mass until the milk solids are brought into substantially permanent combination with the water and the product is purified of offensive odors.

8. The process of remaking liquid milk from dry milk which consists in adding water to the latter and heating the mass and blowing air therethrough to agitate and aerate it, so as to bring the milk solids into substantially permanent combination with the water and to purify the product of offensive odors.

9. The process of remaking liquid milk from dry milk which consists in adding water to the latter and agitating and applying heat to the mass until the milk solids are brought into substantially permanent combination with the water, and then immediately cooling the mass to check decomposition.

10. The process of remaking liquid milk from dry milk which consists in adding water to the latter and heating the mass below the boiling-point and blowing air violently therethrough to agitate and aerate it so as to bring the milk solids into substantially permanent combination with the water and to purify the product of offensive odors.

11. In the concentrating of milk the process which consists in heating it and simultaneously blowing air into it so as to maintain a low temperature and to preserve the proteids in soluble and peptogenic condition, and raising the temperature of the milk near the end of the process and for so short a time as not to substantially modify the proteids to a point above the coagulating temperature of albumen.

In witness whereof we have hereunto signed our names in the presence of two subscribing witnesses.

CHARLES H. CAMPBELL.
PEARL T. CAMPBELL.

Witnesses to signature of Charles H. Campbell:

EUGENE G. MEYERS,
THEODORE T. SNELL.

Witnesses to signature of Pearl T. Campbell:

DOMINGO A. USINA,
THEODORE T. SNELL.